May 5, 1964
G. M. WALLER
3,131,470
METHOD OF MAKING VALVE LIFTERS
Filed Dec. 9, 1960
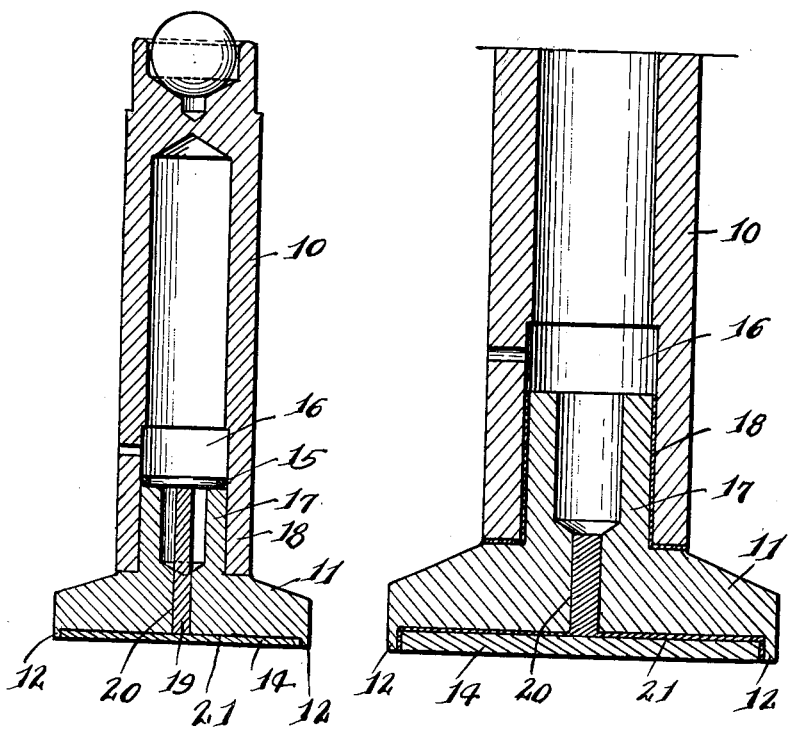
Inventor
Gustav M. Waller
By Hofgren, Brady,
Wegner, Allen & Stellman
Attorneys 3,131,470
METHOD OF MAKING VALVE LIFTERS
Gustav M. Waller, Geneva, Ill., assignor to Burgess-Norton Mfg. Co., a corporation of Illinois
Filed Dec. 9, 1960, Ser. No. 74,839
3 Claims. (Cl. 29—471.1)

The present invention relates to methods of making valve lifters and more particularly to methods of brazing together the component parts of valve lifters.

The valve lifters in internal combustion engines are subject to severe wear from the rubbing action of the cams. In order to reduce this wear to a minimum, cemented carbide wafers have been attached to that portion of the valve lifter which is in contact with the cam. At the present time, such carbide wafers are brazed to the head of a valve lifter by melting a brazing metal such as copper and allowing the molten brazing metal to flow between the wafer and the head of the valve lifter. Upon cooling the carbide wafer is securely bonded to the valve lifter head. For the purposes of controlling the flow of the molten brazing metal, it has been necessary in the past to place some type of retaining member around the valve head and the carbide wafer.

In the manufacture of a mass production item such as valve lifters, it is desirable to eliminate as many members as possible and to make the members remaining in the assembly as simple and economical to manufacture as possible.

It is an object of the present invention to provide a new and improved method of making valve lifters.

Another object of the present invention is to provide a method of brazing together all the component parts of a valve lifter without the use of a special additional member to control the flow of the molten brazing metal.

A further object is to provide a method of making a valve lifter comprised of a tubular stem, a valve lifter head and a carbide wafer by melting a copper slug and a copper ring placed inside the tubular stem and allowing the molten copper to flow between the adjoining surfaces of the three components.

An additional object is to provide a valve lifter head having a lip portion around the outer diameter of its outer end surrounding a carbide wafer in such a manner that molten copepr may flow between the wafer and the valve lifter head to braze the wafer to the head.

Further objects and advantages will become apparent from the following detailed description taken in connection with the accompanying drawings, in which:

FIGURE 1 is a sectional view of an embodiment of the present invention prior to being heated; and FIGURE 2 is an enlarged sectional view of the lower portion of the embodiment of the present invention shown in FIGURE 1 after it has been heated.

While this invention is susceptible of embodiments in many different forms, there is shown in the drawings and will herein be described in detail, an embodiment of the invention with the understanding that the present disclosure is to be considered as an exemplification of the principles of the invention and is not intended to limit the invention to the embodiment illustrated. The scope of the invention will be pointed out in the appended claims.

In order to make a valve lifter as wear resistant as possible and at the same time as economical to manufacture as possible, the lifter herein disclosed is composed of three components, which are of a relatively simple construction.

Referring now to FIGURE 1, a hollow tubular valve lifter stem 10 may be made either by a screw machine operation or by a cold extrusion process. A valve lifter head 11 can be easily manufactured by a screw machine operation. Therefore both the stem 10 and the valve head 11 are relatively inexpensive to manufacture. A shallow lip 12 is formed around the outer diameter of the outer end of the valve lifter head 11 by first forming this lip in a horizontal plane and surface grinding the top of the head to assure flatness. A die then wipes the outer cylindrical surface of the head 11, causing the lip 12 to take the vertical form shown in the FIGURES. A carbide wafer 14 is the third simple component of the valve lifter.

The method of assembly starts with an insertion of a copper ring 15 into the hollow 16 of the tubular stem 10. A cylindrical portion 17 of the head 11, which is preferably made of steel, is then pressed into the hollow 16 of the stem 10. When the valve lifter is stood upright on the head 11 as shown in FIGURE 1, the copper ring 15 rests on the inner end of the head 11 in close proximity to the upper end of adjoining surfaces 18 of the stem 10 and the head 11. Since the stem 10 and the head 11 are joined together by a press fit the narrow spacing between them is a function of the surface roughness.

A copper slug 19 is placed in a center bore 20 of the head 11. The carbide wafer 14 is then placed on a brazing tray or other suitable heating apparatus and the stem 10 and head 11 are stood upright upon it as shown in FIGURE 1 with the lip 12 surrounding the wafer 14. The weight of the head 11 and the stem 10 will furnish sufficient pressure to hold the wafer firmly in contact with the head. The lip 12 has two functions. It keeps the wafer 14 aligned with the head 11 horizontally, and it increases capillary action between the head 11 and the wafer 14. With the assembly of components resting upright on the brazing plate they are heated to a sufficiently high temperature to melt both the copper ring 15 and the copper slug 19. The molten copper from the ring 15 will flow down along the adjoining surfaces 18 between the stem 10 and the head 11 as shown in FIGURE 2. The molten copper from the slug 19 flows along the adjoining surfaces 21 between the head 11 including the lip 12 and the wafer 14.

It will be apparent to those skilled in the art that the ring 15 and the slug 19 can be composed of any other suitable brazing metal and they are not required to be composed of the same brazing metal.

After the valve lifter has been heated to a sufficiently high temperature for a sufficient time for capillary action to completely fill both the adjoining surfaces 18 and 21 as shown in FIGURE 2, the copper is allowed to cool and solidify. Thus a valve lifter is produced by a simple and efficient method of brazing together three simple and economical components.

I claim:
1. A method of making a valve lifter comprising, producing a tubular rod open at one end and having an internal cylindrical wall surface adjacent said open end, producing a head having a cylindrical portion fitting inside said internal wall surface through said end, a flat outer surface and a central bore through said cylindrical portion and communicating with said surface, producing a carbide facing member for covering said surface, introducing a ring of brazing metal into said open end, introducing a rod of brazing metal into said bore, inserting said cylindrical portion into said open end to fit inside said internal wall surface, placing the surface of said head on said facing member and heating said parts while in such upright position to a temperature above the melting point of the brazing metal to melt said metal and permit the metal from said ring to flow between the cylindrical portion of the head and the internal wall surface adjacent the open end of the tubular rod and the metal from said rod to flow between the end surface of said head and said facing and cooling said parts while in such position.

2. A method of making a valve lifter comprising, producing a tubular rod open at one end and having an internal cylindrical wall surface adjacent said open end, producing a head having a cylindrical portion fitting inside said internal wall surface through said end, a flat outer surface with an annular lip extending from said outer surface along the edge thereof and a central bore communicating with said surface, producing a carbide facing member for covering said surface, introducing a ring of brazing metal into said open end, introducing a rod of brazing metal into said bore, inserting said cylindrical portion into said open end to fit inside said internal wall surface, placing the surface of said head on said facing member with said lip encircling said facing member and heating said parts while in such upright position to a temperature above the melting point of the brazing metal to melt said metal and permit the metal from said ring to flow between the cylindrical portion of the head and the internal wall surface adjacent the open end of the tubular rod and the metal from said rod to flow between the end surface of said head and lip and said facing member and cooling said parts while in such position.

3. A method of making a valve lifter comprising, producing a tubular rod open at one end and having an internal cylindrical wall surface adjacent said open end, producing a head having a cylindrical portion fitting inside said internal wall surface through said end, a flat outer surface with a circular lip extending from said outer surface along the edge thereof and a central bore communicating with said surface, producing a carbide facing member for covering said surface, introducing a ring of copper into said open end, introducing a rod of copper into said bore, pressing said cylindrical portion into said open end to fit inside said internal wall surface, placing the surface of said head on said facing member with the said lip encircling said facing member and heating said parts while in such upright position to a temperature above the melting point of the copper to melt said copper and permit the copper from said ring to flow between the cylindrical portion of the head and the internal wall surface adjacent the open end of the rod and the copper from said rod to flow between the end surface of said head and lip and said facing member and cooling said parts while in such position.

References Cited in the file of this patent

UNITED STATES PATENTS

| | | |
|---|---|---|
| 507,974 | Crosby | Oct. 31, 1893 |
| 1,470,409 | Wilcox | Oct. 9, 1923 |
| 1,570,023 | Wilcox | Jan. 19, 1926 |
| 1,735,695 | Rich | Nov. 12, 1929 |
| 1,991,582 | Sterling | Feb. 19, 1935 |
| 2,987,815 | Zeller | June 13, 1961 |

FOREIGN PATENTS

| | | |
|---|---|---|
| 575,515 | Germany | June 28, 1933 |